MICRODISPENSING DEVICE

Original Filed Nov. 10, 1969 2 Sheets-Sheet 1

INVENTORS
Michael E. Drummond
BY John E. Robinson
Schlesinger, Arkwright & Garvey
ATTORNEYS

MICRODISPENSING DEVICE

Original Filed Nov. 10, 1969 2 Sheets-Sheet 2

INVENTORS
Michael E. Drummond
BY John E. Robinson

Schlesinger, Arkwright & Garvey
ATTORNEYS

United States Patent Office

Re. 27,645
Reissued May 29, 1973

27,645
MICRODISPENSING DEVICE

Michael E. Drummond, West Chester, and John E. Robinson, Springfield, Pa., assignors to Drummond Instrument Co., Broomall, Pa.

Original No. 3,606,086, dated Sept. 20, 1971, Ser. No. 875,082, Nov. 10, 1969. Application for reissue Feb. 11, 1972, Ser. No. 225,683
Int. Cl. B67d *5/22*
U.S. Cl. 222—49 12 Claims

Matter enclosed in heavy brackets [ ] appears in the original patent but forms no part of this reissue specification; matter printed in italics indicates the additions made by reissue.

ABSTRACT OF THE DISCLOSURE

This invention is a microdispensing device into which a precision amount of liquid may be drawn and dispensed. The device includes a barrel having a bore and a disposable capillary tube removably held in communication with one terminal of the bore. A plunger moves through the barrel and the capillary tube, the plunger extending through an end cap in the opposite terminal of the barrel. Uniformly spaced annular recesses in the outer periphery of a plunger holder selectively engage a wire spring detent for determining by "feel" the amount of liquid dispensed. Travel limiting inserts removably positioned in the barrel regulate the length of the plunger stroke and consequently the amount of liquid drawn into and dispensed from the device.

OBJECTS AND DESCRIPTION OF FIGURES OF DRAWINGS

It is an object of this invention to provide a microdispensing device into which small, accurately measured amounts of liquid are drawn, and subsequently dispensed therefrom.

Another object is to provide a microdispensing device which includes a barrel holding a capillary tube through which a plunger operates, to draw liquid into, and dispense liquid from, the capillary tube. The plunger is connected to a plunger holder having a plurality of graduations in the form of annular recesses engaged by a detent carried by the barrel as the plunger holder and plunger move through the barrel, for indicating to the user by "feel," the exact quantity of liquid which has been drawn into or dispensed from, the device.

A further object is to provide a microdispensing device wherein the capillary tube is removably inserted into the barrel for ready replacement, a portion of the barrel being cut-away to afford a visual indication that the tube is properly seated in the barrel, the device being further provided with means for holding the tube in seated position.

A still further object is to provide a microdispensing device of the character described, with the addition of barrel inserts of different sizes selectively inserted into the barrel for regulating the length of the stroke of the plunger and plunger holder, thereby limiting the quantity of liquid drawn into and dispensed by the device.

Other objects will be manifest from the following description of the presently preferred form of the present invention, taken in conjunction with the appended drawing, wherein FIG. 1 is a side elevational view of the microdispensing device of the present invention;

DETAILED DESCRIPTION OF INVENTION

Figure 1:
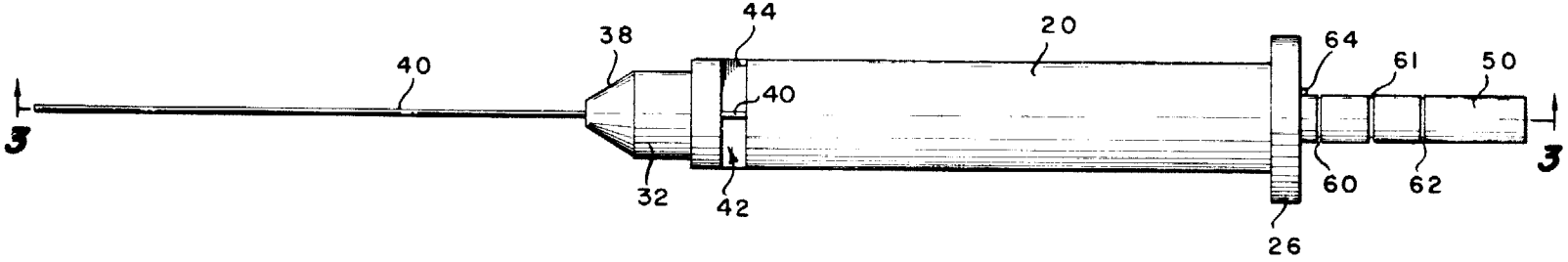

The microdispensing device of the present invention includes a cylindrical barrel 20 having an axial bore 22 in which is located a convolute spring 24.

An end cap 26 is provided with a central reduced extension 28 which is threadably engaged with the internal wall of barrel 20, as indicated at 30, for permitting positioning and removal of the end cap.

The opposite end of barrel 20 is closed by a wall 32, the central forward portion of which is extended as indicated at 34. Extension 34 is of cylindrical shape, the outer periphery of which is threaded at 36 for engagement with a collet 38. An O-ring is indicated at 39.

Figure 3:
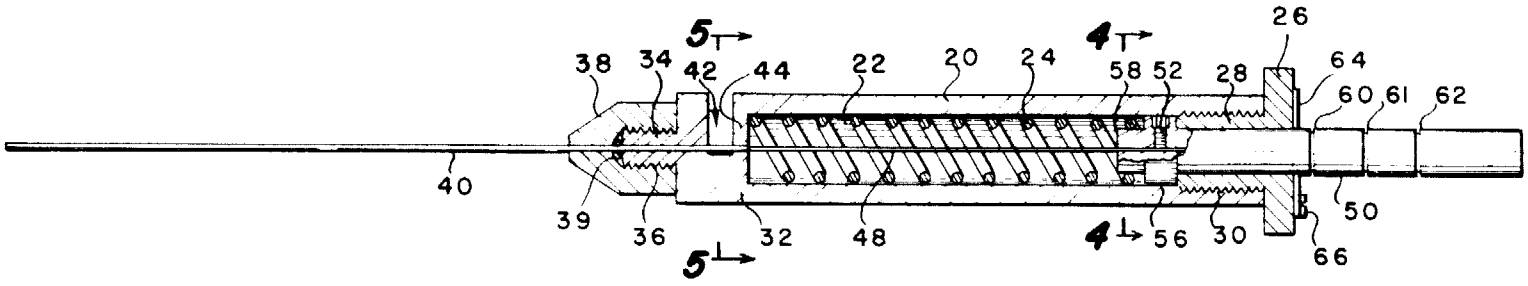
FIG. 3 is a longitudinal sectional view taken along the line 3—3 of FIG. 1, looking in the direction of the arrows.
Figure 5:
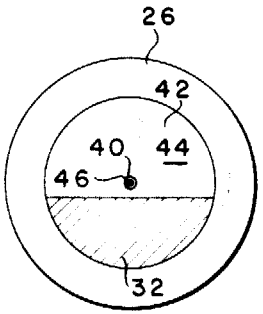
FIG. 5 is a cross-sectional view taken along the line 5—5 of FIG. 3, looking in the direction of the arrows.
Figure 4:
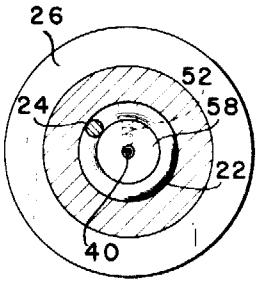
FIG. 4 is a cross-sectional view taken along the line 4—4 of FIG. 3, looking in the direction of the arrows.

In accordance with the present invention, and as shown to advantage in FIG. 3, a disposable glass capillary tube 40 of predetermined length is inserted through the central aperture of collet 38, through O-ring 39 and through an axial opening in extension 34 and wall 32. At a point adjacent, but spaced from axial bore 22, a semi-circular segment of wall 32 is cut-away as indicated at 42, the cut-away section extending from the outer periphery of the wall to a point just beyond the axial bore of the wall.

A thin wall 44 between the cut-away section and bore 22 serves as an abutment for properly seating capillary tube 40. Wall 44 is further provided with an axial bore 46 which is of reduced cross-sectional area in order to prevent passage of capillary tube 40 therethrough.

Tube 40 is fixedly held in position by collet 38 during the filling and dispensing operation. When it is desired to remove tube 40 for disposal and replacement, collet 38 is unscrewed from extension 34, thereby permitting the tube to be moved longitudinally through the axial opening in extension 34 and wall 32.

It is further within the contemplation of the present invention to provide a plunger 48 which is preferably of stainless steel construction, the cross-sectional area of which is approximately equal to the cross-sectional area of the bore of capillary tube 40, in order to permit passage of plunger 48 therethrough in a manner to expel liquid in advance thereof from the tube. The cross-sectional area of the plunger is also approximately equal to the cross-sectional area of the bore 46 of wall 44 to allow communication of the plunger with the bore of the capillary tube.

The inner terminal of plunger 48 is held by a plunger holder 50 of cylindrical shape, the plunger extending into an axial recess located at the inner terminal of the plunger holder, and removably held by a set screw 52.

It will be noted from a consideration of FIG. 3, that plunger holder 50 is of uniform diameter throughout a substantial portion of its length and extends through a bore in end cap 26 and central extension 28. Inwardly of barrel 20, and slightly spaced from the inner terminal of plunger 48, holder 50 is provided with an annular enlargement comprising a stop 56 beyond which the plunger holder is extended at 58.

As shown in FIG. 3, one terminal of coil spring 24 is in contiguous engagement with the outer periphery of extension 58, the rearward movement of spring 24 being limited by engagement with stop 56 which extends between the main body portion of plunger 48 and the inner wall of barrel 20. By means of this structure, spring 24 urges plunger holder 50 in an outward direction in a well known manner.

Figure 2:
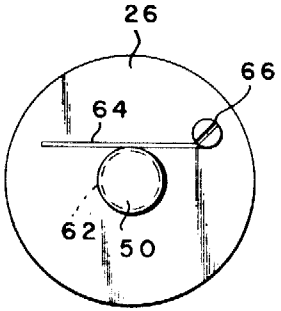
FIG. 2 is an end elevational view of the same.

Plunger holder 50 is further provided with a series of graduations comprising uniformly spaced annular recesses 60, 61 and 62 which are normally beyond cap 26 externally of barrel 20. In co-operation with annular recesses 60, 61 and 62, end cap 26 is provided with an exterior detent, as shown in FIG. 2, the detent including a round wire spring 64, one terminal of which is coiled around a retaining screw 66. Wire spring 64 extends across a substantial portion of end cap 26 and, as shown in FIGS. 2 and 3, is so located that the wire spring engages annular recesses 60, 61 and 62 as plunger holder 50 reciprocates back and forth through end cap 26.

The device of the present invention is so constructed that when plunger 48 and plunger holder 50 are urged under finger pressure through bore 22 of barrel 20 and capillary tube 40 against the tension of spring 24, and when the outer terminal of plunger holder 50 is uniplanar with the outer planar surface of end cap 26, then the opposite terminal of plunger 48 protrudes approximately one-sixteenth of an inch beyond capillary tube 40. This insures complete delivery of the liquid sample from capillary tube 40, even when plunger holder 50 sinks slightly into the flesh of the finger tip, preventing the terminal of the holder from lying coplanar with end cap 26.

As fluid is drawn into the capillary tube by permitting the tension of coil spring 24 to reverse the direction of movement of the plunger and plunger holder, then liquid is drawn into tube 40. As spring detent 64 engages annular recess 60, the user of the device "feels" the contact of the spring and recess, and is immediately advised that a specified amount of liquid, e.g., one microliter, has been drawn into capillary tube 40. In like manner, the user is also advised when the spring detent 64 engages recesses 61 and 62 that additional quantities of liquid have been drawn into the capillary tube, e.g. two microliters and three microliters.

It is also a salient part of the present invention to provide means for limiting the length of the stroke of plunger 48 and plunger holder 50. These inserts comprise cylindrical sleeves 68 and 70 which are adapted to be selectively placed within axial bore 22 of barrel 20.

Figure 8:
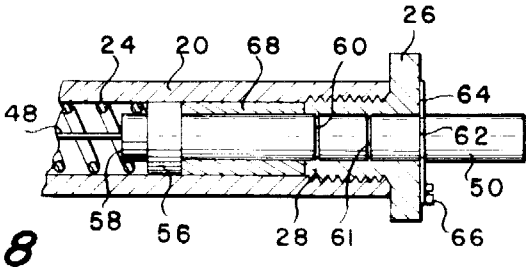
FIG. 8 is a fragmentary sectional view similar to FIG. 3, showing a barrel insert in position

As shown in FIG. 8, insert 68, for example, may be inserted into bore 22 by first removing end cap 26 and then fitting the insert over the body of plunger holder 50. The insert is slid along the body of the plunger holder until the inner terminal thereof engages stop 56. End cap 26 is next threaded into bore 20, the extension portion 28 engaging the outermost terminal of the insert, thereby forcing the insert and plunger holder inwardly against the tension of spring 24.

Figure 7:
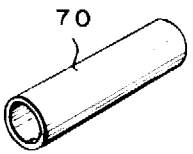
FIG. 7 is a view similar to FIG. 6, illustrating a barrel insert of different size.
Figure 6:
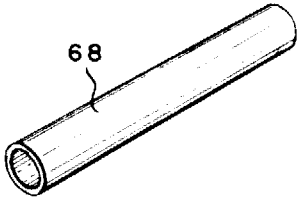
FIG. 6 is a perspective view of a barrel insert, forming a part of the present invention.

As shown to advantage in FIG. 8, the length of the stroke of plunger holder 50 and plunger 48 is thereby limited, so that upon full depression of the plunger holder, a lesser amount of liquid is drawn into the capillary tube 40 with the end cylindrical insert which is shown in FIG. 8, only one microliter of liquid is drawn into the capillary tube, and with the cylindrical insert shown in FIG. 7, two microliters of liquid is drawn into the capillary tube. Various sizes of inserts may of course be employed to regulate the maximum amount of liquid which may be drawn into a capillary tube.

While the invention has been described, it will be understood that it is capable of further modifications and this application is intended to cover any variations, uses, or adaptations of the invention following in general, the principles of the invention and including such departures from the present disclosure as come within known ar customary practice in the art to which the invention pertains, and as may be applied to the essential features hereinbefore set forth and as fall within the scope of the invention or the limits of the appended claims.

What we claim is:

1. A microdispensing device comprising:

(a) a barrel having a cap at one terminal thereof,
(b) tube means inserted into the opposite terminal of said barrel,
(c) a plunger movable through said barrel and said tube means for drawing liquid into and dispensing liquid from said tube means,
(d) a plunger holder fixed to one terminal of said plunger,
(e) said plunger holder extending through said cap and being provided with annular recesses,
(f) detent means mounted on said cap for engagement with the annular recesses of said plunger holder,
(g) whereby upon movement of said plunger, and plunger rod through said cap, said detent means selectively engages the annular recesses of said plunger holder in order that the user may "feel" when a predetermined amount of liquid has been drawn into, or dispensed from, said tube means,
(h) spring means within said barrel for biasing said plunger holder outwardly of said barrel, and
(i) an insert removably positioned within said barrel, for limiting the stroke of said plunger rod and thereby regulate the amount of liquid drawn into, and dispensed from said tube means.

2. A microdispensing device comprising:
(a) a barrel having a cap at the rear thereof,
(b) a plunger extending through said barrel,
(c) a plunger holder engaged with a terminal of said plunger, a portion of said plunger holder extending through said cap,
(d) the opposite end of said barrel having a wall,
(e) an axial bore extending through said barrel,
(f) a segment of said wall being cut away from the outer periphery to the axial bore,
(g) the axial bore in said wall rearwardly of the cut-away segment being of reduced diameter for the reception of said plunger,
(h) tube means for insertion through the axial bore of the forward portion of said wall and through the cut-away portion of the barrel,
(i) the inner terminal of said tube means abutting against that portion of the wall adjacent the cut-away segment, having an axial bore of reduced diameter,
(j) whereby visual indication of the proper seating of said tube means in said barrel is afforded, and
(k) means for holding said tube means in position within said barrel.

3. The microdispensing device of claim 2, wherein said means for holding said tube means in position within the barrel includes:
(a) a collet threadedly engaged with the forward extremity of said barrel,
(b) said collet being in retaining engagement with said tube means.

4. A microdispensing device including:
(a) a barrel having an axial bore,
(b) a cap covering one end of said barrel,
(c) a wall at the opposite end of said barrel,
(d) a wall at the opposite end of said barrel,
(d) the forward portion of said wall being provided with a reduced axial bore of the forward portion of said wall.
(e) a capillary tube inserted through the reduced axial bore of the forward portion of said wall,
(f) a portion of said wall being cut away from the outer periphery of the wall to the axial bore thereof,
(g) the remaining portion of said wall being further reduced in size to prevent the passage of said capillary tube therethrough,
(h) whereby visual indication is afforded of the proper seating of said capillary tube,
(i) a plunger extending axially through said barrel into said capillary tube, (j) plunger holder connected to the rear terminal of said plunger,
(k) said plunger holder extending through said cap, and
(l) means for normally biasing said plunger and plunger holder in a rearward direction.

5. The microdispensing device of claim 4, wherein:
(a) the outer portion of said plunger holder is provided with a plurality of spaced annular recesses comprising graduations, and
(b) a spring detent carried by said cap for engagement with the annular recesses of said plunger holder,
(c) whereby the user can "feel" when a predetermined amount of liquid has been drawn into or expelled from, said capillary tube.

6. The microdispensing device of claim 5, with the dition of:
(a) inserts of different length selectively placed in said barrel between the terminal of said plunger holder and said cap, to limit the throw of said plunger and plunger holder, and the amount of liquid drawn into, and dispensed from, said capillary tube.

7. A microdispensing device comprising:
(a) a barrel having a cap at one terminal thereof,
(b) tube means inserted into the opposite terminal of said barrel,
(c) a plunger movable through said barrel and said tube means for drawing liquid into and dispensing liquid from said tube means,
(d) a plunger holder fixed to one terminal of said plunger,
(e) said plunger holder extending through said cap and being provided with annular recesses, and
(f) detent means mounted on said cap for engagement with the annular recesses of said plunger holder,
(g) whereby upon movement of said plunger, and plunger rod through said cap, said detent means selectively engages the annular recesses of said plunger holder in order that the user may "feel" when a predetermined amount of liquid has been drawn into, or dispensed from, said tube means,
(h) said barrel including a wall at the front end thereof,
(i) an axial bore in said wall,
(j) a portion of said wall being cut away from the outer periphery inwardly to the longitudinal axis of said wall,
(k) the axial bore in the forward portion of said wall being of a diameter to permit passage of said tube means therethrough,
(l) the size of the axial bore being reduced beyond the cut-away portion of the wall to permit passage of said plunger through the wall into said tube means while preventing rearward movement of said tube means beyond the cut-away portion of the wall,
(m) whereby visual indication is afforded of the proper location of said tube means.

8. The microdispensing device of claim 7, with the addition of:
(a) an extension protruding forwardly of said wall, and
(b) a collet threadedly engaged with said extension,
(c) said collet being in retaining engagement with said tube means.

9. A microdispensing device comprising:
(a) a barrel having a cap at one terminal thereof,
(b) tube means inserted into the opposite terminal of said barrel, (c) a plunger movable through said barrel and said tube means for drawing liquid into and dispensing liquid from said tube means,
(d) a plunger holder fixed to one terminal of said plunger,
(e) said plunger holder extending through said cap [and being provided with annular recesses], and
(f) an insert removably positioned with said barrel, for limiting the stroke of said plunger rod and thereby regulate the amount of liquid drawn into, and dispensed from, said tube means.

10. The microdispensing device of claim 9, with the addition of:
(a) inserts of different lengths selectively placed in said barrel between the terminal of said plunger holder and said cap, to limit the throw of said plunger and plunger holder, and the amount of liquid drawn into, and dispensed from, said capillary tube.

11. The microdispensing device of claim 9, wherein:
(a) said barrel includes a wall at the front end thereof,
(b) an axial bore in said wall,
(c) a portion of said wall being cut-away from the outer periphery inwardly to the longitudinal axis of said wall,
(d) the axial bore in the forward portion of said wall being of a diameter to permit passage of said tube means therethrough,
(e) the size of the axial bore being reduced beyond the cut-away portion of the wall to permit passage of said plunger through the wall into said tube means while preventing rearward movement of said tube means beyond the cut-away portion of the wall,
(f) whereby visual indication is afforded of the proper location of said tube means.

12. The microdispensing device of claim 11, with the addition of:
(a) an extension protruding forwardly of said wall, and
(b) a collet threadedly engaged with said extension,
(c) said collet being in retaining engagement with said tube means.

References Cited

The following references, cited by the Examiner, are of record in the patented file of this patent or the original patent.

UNITED STATES PATENTS

| | | | |
|---|---|---|---|
| 197,017 | 11/1877 | Colmer | 222—309 X |
| 2,373,520 | 4/1945 | Wallin | 128—218 C |
| 2,474,496 | 6/1949 | Rayman | 128—218 C |
| 2,530,909 | 11/1950 | Riggs | 222—309 X |
| 2,558,998 | 7/1951 | Yearout | 222—49 |
| 2,943,624 | 7/1960 | Alquist | 128—218 C |
| 3,101,084 | 8/1963 | Hamilton | 128—218 C |
| 1,393,720 | 10/1921 | Lamos et al. | 128—234 |
| 2,128,254 | 8/1938 | Kile | 222—309 |
| 3,343,539 | 9/1967 | Moorhouse | 128—234 |
| 2,875,761 | 3/1959 | Helmer et al. | 128—218 C |

FOREIGN PATENTS

| | | | |
|---|---|---|---|
| 603,701 | 8/1960 | Canada | 222—309 |

M. HENSON, WOOD, JR., Primary Examiner

E. D. GRANT, Assistant Examiner

U.S. Cl. X.R.

128—218 C; 222—156, 309